L. S. STREPEY.
NUT AND BOLT LOCK.
APPLICATION FILED SEPT. 21, 1910.

990,681.

Patented Apr. 25, 1911.

Witnesses
Otto E. Haddick.
C. H. Roessner.

Inventor
Lindsay S. Strepey.
By C. J. O'Brien.
Attorney

UNITED STATES PATENT OFFICE.

LINDSAY S. STREPEY, OF VICTOR, COLORADO.

NUT AND BOLT LOCK.

990,681.  Specification of Letters Patent.   Patented Apr. 25, 1911.

Application filed September 21, 1910. Serial No. 583,137.

*To all whom it may concern:*

Be it known that I, LINDSAY S. STREPEY, a citizen of the United States, residing at Victor, county of Teller, and State of Colorado, have invented certain new and useful Improvements in Nut and Bolt Locks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in nut and bolt locks, my object being to lock the nut against turning on the bolt, and also to lock the bolt against turning in the parts connected thereby, especially where one of the parts to be connected is composed of wood or other material sufficiently soft to be easily penetrated by brads with which the washer is provided.

In my improved construction the threaded portion of the bolt is flattened on one side by cutting away the threads, thus shaping the bolt to fit the washer, whose opening is of counterpart shape, and locking the washer and bolt against independent rotary movement. Then if the washer is equipped with brads or other devices adapted to penetrate the part with which it is in contact, the washer is prevented from turning and will also lock the bolt against turning. After the nut is screwed upon the bolt, a part of the washer is bent outwardly to engage one side of the nut, to prevent the latter from turning upon the bolt, thus securely locking both the nut and bolt against turning.

Having briefly outlined my improved construction, I will proceed to describe the same in detail, reference being made to the accompanying drawing in which is illustrated an embodiment thereof.

Figure 1:
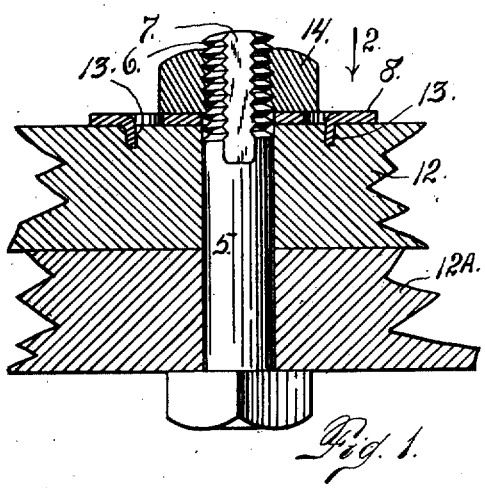
Figure 4:
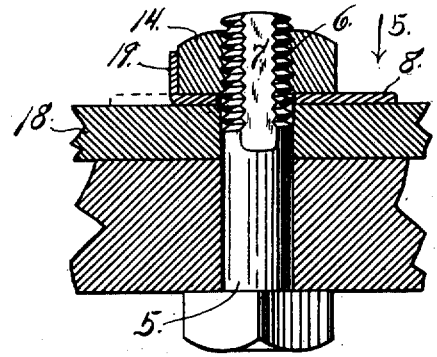
Figure 2:
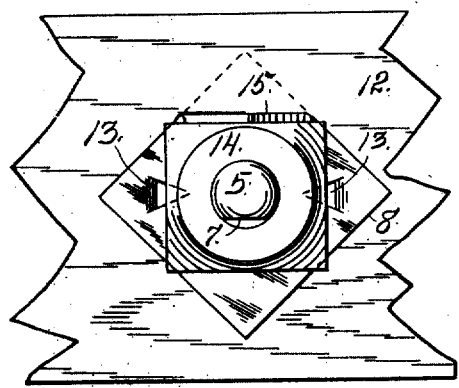
Figure 5:
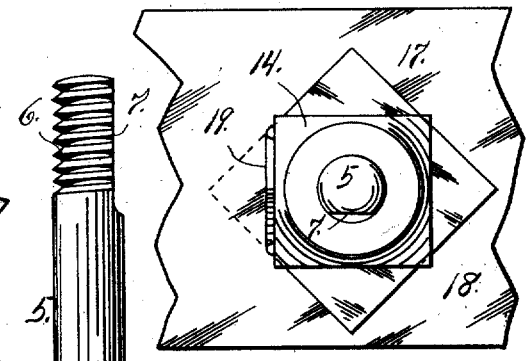
Figure 3:
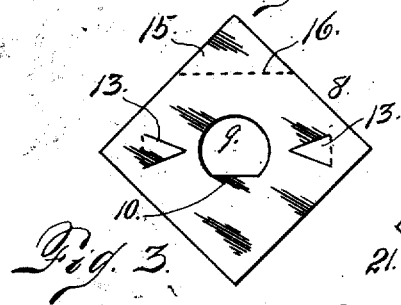
Figure 7:
Figure 8:
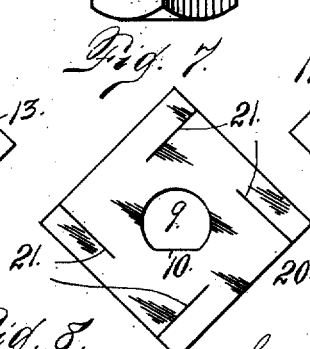
Figure 6:
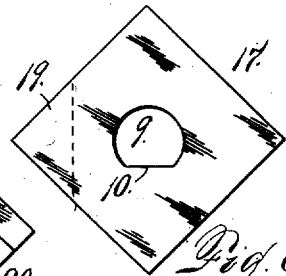

In this drawing: Figure 1 is a sectional view of parts connected by my improved nut and bolt locking devices. In this case one of the parts is supposed to be composed of wood which is indented by brads with which the washer is provided. Fig. 2 is a view looking in the direction of arrow 2 Fig. 1. Fig. 3 is a plan view of the washer of the construction illustrated in Figs. 1 and 2. Fig. 4 is a sectional view showing my improved construction with the nut locked against turning on the bolt. In this case the washer is not equipped with securing brads. Fig. 5 is a view looking in the direction of arrow 5 Fig. 4. Fig. 6 is a top plan view of the washer of the construction shown in Figs. 4 and 5. Fig. 7 is a detail view of the bolt flattened on one side of the threaded portion in accordance with my invention. Fig. 8 is a locking washer of slightly modified form of construction.

The same reference characters indicate the same parts in all the views.

Let the numeral 5 designate a bolt whose threaded portion 6 is flattened on one side as shown at 7 to receive a washer 8 having an opening 9 adapted to fit the bolt, the opening being straight on one side as shown at 10, to engage the flat side 7 of the threaded portion of the bolt. When one of the parts to be connected is formed of wood, as shown at 12 in Figs. 1 and 2, the washer is equipped with brads 13 which are punched out of it and caused to indent the wood member. The other connected part 12ᴬ may be of either wood or metal. After the bolt is passed through the parts 12 and 12ᴬ, the washer is applied thereto and the nut 14 screwed thereon until it engages the washer. A part 15 of the washer is then bent outwardly on the dotted line 16 to engage one side of the nut, whereby the latter is prevented from being turned on the bolt. In the form of construction shown in Figs. 4 and 5, a washer 17 is employed, which is precisely like the washer 8 except that the washer 17 is not equipped with the penetrating brads 13. This form of washer is employed when the part 18 to be engaged by the washer is formed of metal. In this case the bolt is passed through the parts to be connected, the washer applied thereto and the nut screwed against the washer. The part 19 of the washer is then turned up against one side of the nut to prevent the latter from turning on the bolt.

In the form of construction shown in Fig. 8 the washer, which is designated 20, is provided with a number of slits 21, leaving parts beyond the slits which may be bent outwardly adjacent to the nut to prevent the latter from turning on the bolt. The openings in both of the washers 17 and 20 are precisely the same as in the washer 8, and these openings are therefore correspondingly indicated.

From the foregoing description the use of my improved nut lock construction may be readily understood and need not be explained further in detail.

Having thus described my invention, what I claim is:

A nut and bolt lock comprising in combination with the nut, a bolt having the thread removed on one side to form a smooth flat surface, and a washer apertured to fit the threaded portion of the bolt and having a part turned outwardly to engage one side of the nut to prevent the latter from turning on the bolt, the washer being equipped with brads adapted to penetrate a part composed of wood or other suitable material, substantially as described.

In testimony whereof I affix my signature in presence of two witnesses.

LINDSAY S. STREPEY.

Witnesses:
F. E. BOWEN,
A. EBERT O'BRIEN.

---

Copies of this patent may be obtained for five cents each, by addressing the "Commissioner of Patents, Washington, D. C."